(12) United States Patent
Han

(10) Patent No.: US 8,443,054 B2
(45) Date of Patent: May 14, 2013

(54) METHOD, SYSTEM, AND SCHEDULING SERVER FOR CONTENT DELIVERY

(75) Inventor: Runsheng Han, Nanjing (CN)

(73) Assignee: Huawei Technologies Co., Ltd., Shenzhen (CH)

( * ) Notice: Subject to any disclaimer, the term of this patent is extended or adjusted under 35 U.S.C. 154(b) by 0 days.

(21) Appl. No.: 13/546,592

(22) Filed: Jul. 11, 2012

(65) Prior Publication Data

US 2012/0278451 A1    Nov. 1, 2012

Related U.S. Application Data

(63) Continuation of application No. PCT/CN2011/070207, filed on Jan. 12, 2011.

(30) Foreign Application Priority Data

Jan. 22, 2010  (CN) .......................... 2010 1 0104411

(51) Int. Cl.
*G06F 15/16* (2006.01)

(52) U.S. Cl.
USPC .......................... 709/217; 709/219; 709/227

(58) Field of Classification Search ................... 709/217, 709/219
See application file for complete search history.

(56) References Cited

U.S. PATENT DOCUMENTS

| | | | | |
|---|---|---|---|---|
| 6,141,759 A * | 10/2000 | Braddy | ........................... | 726/14 |
| 6,173,322 B1 | 1/2001 | Hu | | |
| 6,249,800 B1 | 6/2001 | Aman et al. | | |
| 6,747,957 B1 * | 6/2004 | Pithawala et al. | ............. | 370/252 |
| 6,795,858 B1 | 9/2004 | Jain et al. | | |
| 7,930,393 B1 * | 4/2011 | Baumback et al. | ........... | 709/224 |
| 2002/0078233 A1 * | 6/2002 | Biliris et al. | ................... | 709/238 |
| 2002/0120743 A1 * | 8/2002 | Shabtay et al. | ............... | 709/226 |
| 2005/0005019 A1 * | 1/2005 | Harville et al. | ................ | 709/231 |
| 2005/0193114 A1 * | 9/2005 | Colby et al. | .................. | 709/226 |
| 2006/0036743 A1 * | 2/2006 | Deng et al. | .................... | 709/227 |
| 2009/0004974 A1 | 1/2009 | Pyhalammi et al. | | |
| 2009/0271541 A1 * | 10/2009 | Aoki et al. | ....................... | 710/38 |

FOREIGN PATENT DOCUMENTS

| | | |
|---|---|---|
| CN | 1512363 A | 7/2004 |
| CN | 1856137 A | 11/2006 |
| CN | 1937587 A | 3/2007 |
| CN | 101521683 A | 9/2009 |
| EP | 1927921 A1 | 6/2008 |

OTHER PUBLICATIONS

International Search Report issued in corresponding PCT Patent Application No. PCT/CN2011/070207, mailed Apr. 21, 2011.

(Continued)

*Primary Examiner* — Boris Gorney
(74) *Attorney, Agent, or Firm* — Huawei Technologies Co., Ltd.

(57) ABSTRACT

The present disclosure discloses a method, a system, and a scheduling server for content delivery, and pertains to the field of multimedia technologies. The method includes: receiving a service request for accessing content; selecting, according to service processing information of one or more devices storing the content, one device to respond to the service request, where the service processing information includes at least one of the number of services successfully processed, a percentage of services successfully processed, the number of services unsuccessfully processed, and a percentage of services unsuccessfully processed; and base upon the selection, sending the received service request to the selected device. The present disclosure may not only improve the percentage of services successfully processed, but also prevent waste of resources and reduce unnecessary service loss, therefore serving users better.

14 Claims, 5 Drawing Sheets

OTHER PUBLICATIONS

ETSI, "Telecommunications and Internet Converged Services and Protocols for Advanced Networking (TISPAN); Content Delivery Network (CDN) Architecture—Interconnection with TISPAN IPTV Architectures" ETSI TS 182 019. V0.2.7, Jul. 2010.

ETSI, "Telecommunications and Internet Converged Services and Protocols for Advanced Networking (TISPAN); Content Delivery Network (CDN) Architecture—Interconnection with TISPAN IPTV Architectures" ETSI TS 182 019. V0.2.0, Sep. 2009.

Written Opinion of the International Searching Authority issued in corresponding PCT Patent Application No. PCT/CN2011/070207, mailed Apr. 21, 2011.

Office Action issued in corresponding Chinese Patent Application No. 201010104411.7, mailed Aug. 28, 2012.

Search report decision issued in corresponding European patent application No. 11734349.1, dated Feb. 4, 2013, total 6 pages.

* cited by examiner

METHOD, SYSTEM, AND SCHEDULING SERVER FOR CONTENT DELIVERY

CROSS-REFERENCE TO RELATED APPLICATIONS

This application is a continuation of International Application No. PCT/CN2011/070207, filed on Jan. 12, 2011, which claims priority to Chinese Patent Application No. 201010104411.7, filed on Jan. 22, 2010, both of which are hereby incorporated by reference in their entireties.

FIELD

The present disclosure relates to the field of multimedia technologies, and in particular, to a method, a system, and a scheduling server for content delivery.

BACKGROUND

In a CDN (Content Delivery Network) architecture, one CDNCF (Content Delivery Network Control Function) entity controls multiple CCF (Cluster Controller Function) entities, and one CCF entity controls multiple CDF (Content Delivery Function) entities. CDNCF entities and CCF entities are essentially scheduling servers; a CDF entity stores media content sources needed by users and is essentially a content delivery device; and multiple CDF entities form one cluster which is responsible for transferring media content to the users directly.

In the prior art, when a user requests one piece of content, in order to serve the user to the maximum extent, load balancing between multiple CDF entities is to be considered when service requests for the content are delivered to the CDF entities, and the delivery of the service requests is performed according to the principle of load balancing. Meanwhile, when a CDF entity fails and is unable to provide services, CDF entities that are able to provide services are used as far as possible to serve users, and subsequently, service requests are no longer delivered to the failed CDF entities.

When implementing the present disclosure, the inventor finds that the prior art has at least the following drawbacks:

In practical applications, although some CDF entities are still capable of providing services, their actual processing capability is decreased, so that if the service requests are still delivered according to the principle of load balancing in the prior art, it is likely that some services cannot be provided in time. Meanwhile, because there are other CDF entities available in the CDN network, the resources cannot be fully utilized.

SUMMARY

To reduce service loss, enhance a percentage of services successfully processed and user experience, and fully utilize resources, embodiments of the present disclosure provide a method, a system, and a scheduling server for content delivery. The solutions are as follows:

In one aspect, an embodiment of the present disclosure provides a method for content delivery, including:
receiving a service request for accessing content;
selecting, according to service processing information of one or more devices storing the content, one device to respond to the service request, where includes at least one of the number of services successfully processed, a percentage of services successfully processed, the number of services unsuccessfully processed, and a percentage of services unsuccessfully processed; and
base upon the selection, sending the received service request to the selected device.

In another aspect, an embodiment of the present disclosure provides a system for content delivery, including a scheduling server and a content delivery device, where:
the scheduling server is configured to receive a service request for accessing content; select, according to service processing information of one or more content delivery devices storing the content, one content delivery device to respond to the service request, where the service processing information includes at least one of the number of services successfully processed, a percentage of services successfully processed, the number of services unsuccessfully processed, and a percentage of services unsuccessfully processed; and
the selected content delivery device is configured to receive the service request sent by the scheduling server.

An embodiment of the present disclosure also provides a scheduling server, including:
a first receiving module, configured to receive a service request for accessing content;
a selecting module, configured to select, according to service processing information of one or more devices storing the content, one device to respond to the service request, where the service processing information includes at least one of the number of services successfully processed, a percentage of services successfully processed, the number of services unsuccessfully processed, and a percentage of services unsuccessfully processed; and
a sending module, configured to send the service request received by the first receiving module to the device selected by the selecting module.

The solutions of the embodiments of the present disclosure have the following beneficial effect:

By delivering the service request according to the number of services successfully processed, or the percentage of services successfully processed, or the number of services unsuccessfully processed, or the percentage of services unsuccessfully processed, the present disclosure may not only improve the percentage of services successfully processed, but also avoid waste of resources and reduce unnecessary service loss, therefore serving users better.

BRIEF DESCRIPTION OF THE DRAWINGS

To make the solutions of the embodiments of the present disclosure clearer, the accompanying drawings used in the description of the embodiments are briefly described hereunder. Evidently, the accompanying drawings illustrate only some exemplary embodiments of the present disclosure and persons of ordinary skill in the art can obtain other drawings based on these drawings without creative efforts.

DETAILED DESCRIPTION OF THE EMBODIMENTS

To make the objectives, solutions, and advantages of the present disclosure clearer, the embodiments of the present disclosure a re described in detail with reference to the accompanying drawings in the following.

Embodiment 1

Figure 1:
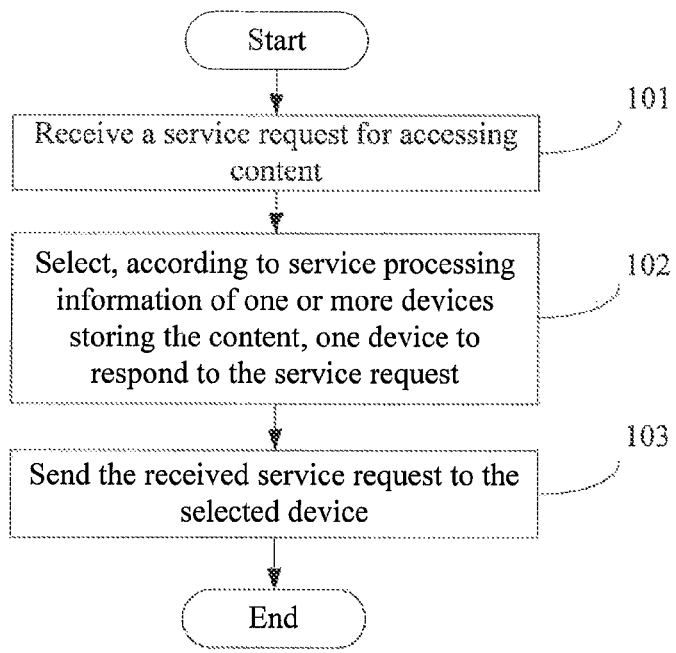
FIG. 1 is a flowchart of a method for content delivery according to a first embodiment of the present disclosure.

Referring to FIG. 1, this embodiment provides a method for content delivery. The specific flow of the method is as follows:

101. Receive a service request for accessing content;

102. Select, according to service processing information of one or more devices storing the content, one device to respond to the service request;

where, the service processing information includes at least one of the number of services successfully processed, a percentage of services successfully processed, the number of services unsuccessfully processed, and a percentage of services unsuccessfully processed; and

103. Send the received service request to the selected device.

By delivering the service request according to the number of services successfully processed, or the percentage of services successfully processed, or the number of services unsuccessfully processed, or the percentage of services unsuccessfully processed, the method of this embodiment may not only improve the percentage of services successfully processed, but also prevent waste of resources and reduce unnecessary service loss, therefore serving users better.

Embodiment 2

This embodiment provides a method for content delivery, and the method adjusts a delivery strategy according to the service processing information of a device, so as to achieve the effect of improving the percentage of services successfully processed and prevent waste of resources. The service processing information includes at least one of the number of services successfully processed, a percentage of services successfully processed, the number of services unsuccessfully processed, and a percentage of services unsuccessfully processed, and this embodiment is described by taking the percentage of services successfully processed as an example of the service processing information. The percentage of services successfully processed or the percentage of services unsuccessfully processed may be calculated by using an existing algorithm. This embodiment has no specific limitation to the algorithm and it would be enough to ensure that a uniform algorithm is applied when respective the percentage of services successfully processed of one or more devices storing the same content or the percentage of services unsuccessfully processed of the one or more devices storing the same content is calculated. Here, the percentage of the number of services successfully processed to the number of service requests is taken only as an example of the percentage of services successfully processed. For example, for a CDF entity 1, the number of the received service requests for accessing content A is 5, and the number of services successfully processed is 2, so the percentage of services successfully processed of the CDF entity 1 is ⅖=0.4. In another example, the percentage of the number of services unsuccessfully processed to the number of service requests is used as a percentage of services unsuccessfully processed. For example, for the CDF entity 1, the number of the received service requests for accessing the content A is 5, and the number of services unsuccessfully processed is 3, so the percentage of services unsuccessfully processed of the CDF entity 1 is ⅗=0.6.

For ease of description, this embodiment takes the content A as an example of the content desired by the user, that is, takes a service request for delivering the content A as an example. The method for content delivery according to this embodiment is described with reference to the network structure shown in FIG. 2, assuming that the delivery strategy is adjusted according to percentage of services successfully processed of devices.

Figure 2:
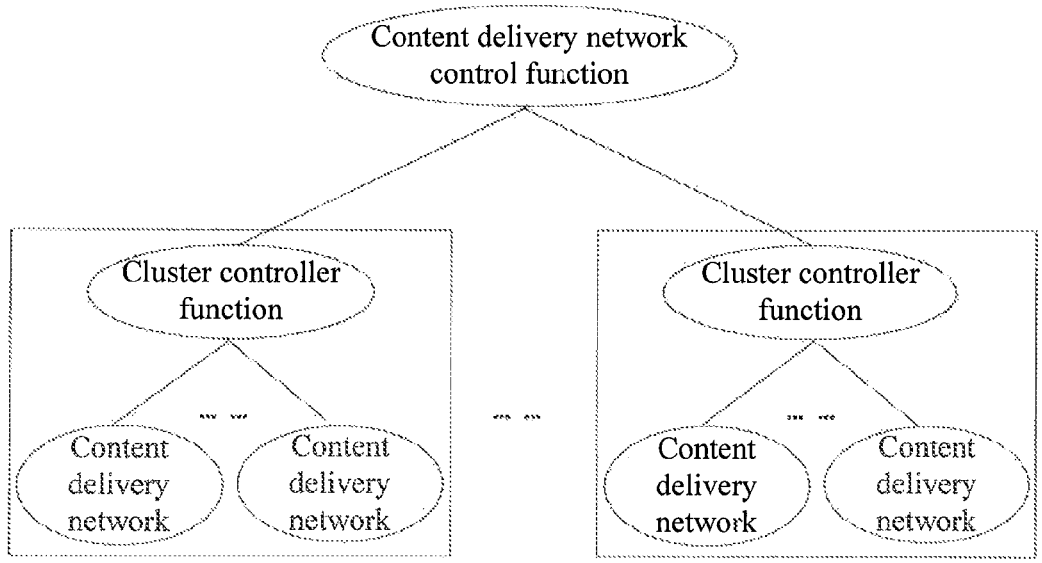
FIG. 2 is a schematic structural diagram of a network according to a second embodiment of the present disclosure.
Figure 3:
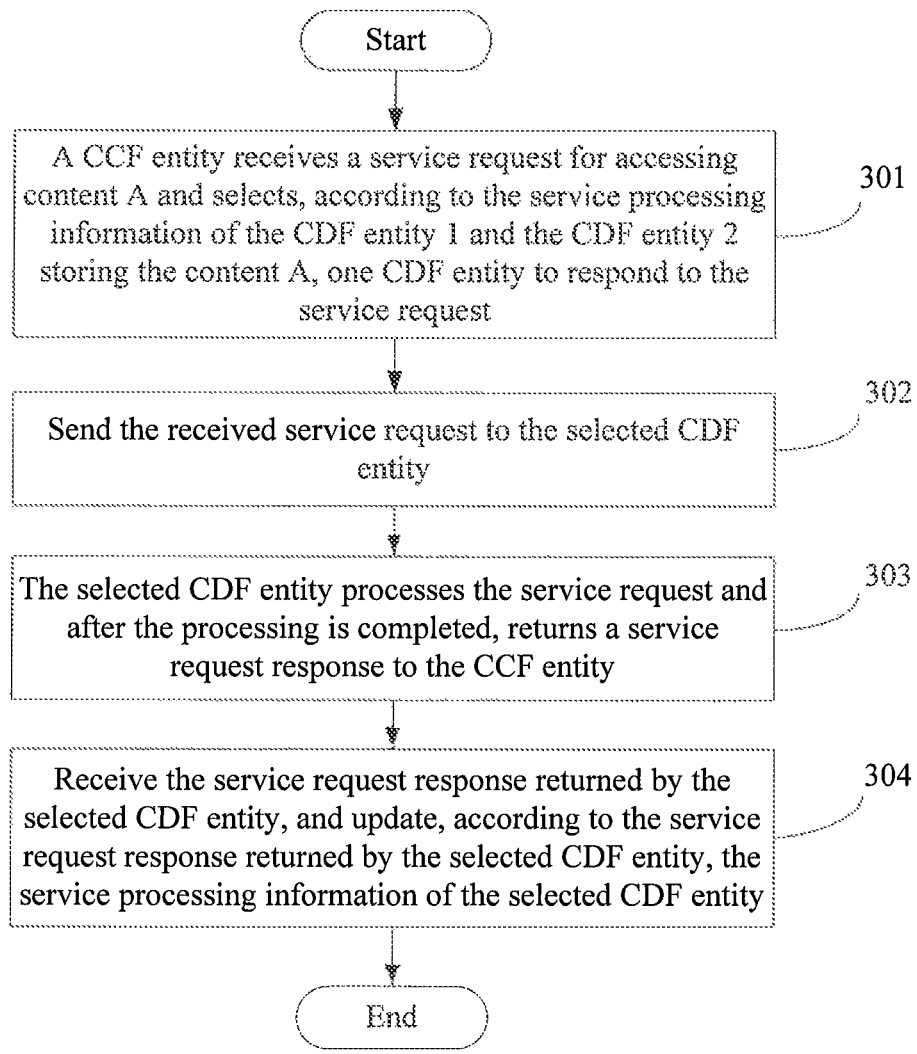
FIG. 3 is a flowchart of a method for content delivery according to the second embodiment of the present disclosure.

As shown in FIG. 2, one CDNCF entity controls multiple CCF entities. When the CDNCF entity receives a service request for accessing content, the CDNCF entity selects one most appropriate CCF entity from the multiple CCF entities; because one CCF entity controls multiple CDF entities, the selected CCF entity selects one most appropriate CDF entity from the multiple CDF entities controlled by the selected CCF entity, and the selected CDF entity is responsible for directly transferring media content to the user. It can be seen that, the CDNCF entity and the CCF entity are scheduling servers in essence, and the CDF entity is a content delivery device for providing the content to the user directly. Both the CDNCF entity and the CCF entity can deliver a service request for the content A. The method for content delivery according to this embodiment is described in detail by assuming that the CCF entity delivers the service request for the content A to the CDF entity, and taking the CDF entity 1 and the CDF entity 2 as an example of the devices storing the content A. Referring to FIG. 3, the specific flow of the method is as follows:

301. A CCF entity receives a service request for accessing the content A and according to the service processing information of the CDF entity 1 and the CDF entity 2 storing the content A, selects one CDF entity to respond to the service request.

Specifically, when selecting, according to the service processing information of the CDF entity 1 and the CDF entity 2 storing the content A, one CDF entity to respond to the service request, this embodiment includes but is not limited to the following two selection methods:

First selection method:

firstly, after one measurement period ends, determining, according to the relationship between the service processing information of the CDF entity 1 and the CDF entity 2 storing the content A and a preset threshold, whether there is an abnormal device;

secondly, setting, according to the number of abnormal devices, a delivery proportion for one or more devices storing the content; and finally, selecting, according to the set delivery proportion of one or more devices storing the content, one device to respond to the service request.

Second selection method:

selecting, according to the sequence corresponding to the current service processing information of one or more devices storing the content, one device from the first N devices to respond to the service request, where N is a natural number less than a total number of all devices storing the content.

The two selection methods each are described in detail in the following:

Both the measurement period in the first selection method and the measurement period mentioned in follow-up steps can be determined by specific configuration, and the measurement period may be a specific time period or the number of delivered service requests, for example, the measurement period is configured to 1 second, or 1 minute, and so on, or one measurement period is 10 delivered service requests, that is, one period during which 10 service requests are delivered is used as one measurement period. This embodiment does not limit the specific content of the measurement period. There are various reasons why a service request for content fails. The failure may be caused by a CCF entity as a scheduling server or by an entity controlling the scheduling server, such as the CDNCF entity controlling the CCF entity. This embodiment does not impose any specific limitation on the reason for the failure of a service request for content.

Regarding how to determine whether there is an abnormal device in the first selection method, for ease of description, this embodiment is described by taking the CDF entity 1 as an example of an abnormal device. Specifically, there are two cases in determining whether there is an abnormal device:

I. The content is stored on multiple devices:

Sorting the percentage of services successfully processed of the one or more devices storing the content, and determining whether there is an abnormal device according to a difference of percentage of services successfully processed between each device. For example, when the difference between the percentage of services successfully processed of two devices is higher than a preset threshold, it is determined that there is an abnormal device and the device having a lower percentage of services successfully processed is the abnormal device. For example, for the service request for the same content A, the percentage of services successfully processed of the CDF entity 1 is 0.5 while the percentage of services successfully processed of the CDF entity 2 is 1. Because the difference between the percentage of services successfully processed of the two CDF entities is "50%", if the preset threshold is 40%, it is determined that the CDF entity 1 which has a lower percentage of services successfully processed is an abnormal device because the difference 50% between the percentage of services successfully processed of the two CDF entities is larger than the preset threshold 40%. Similarly, if the service processing information is the number of services successfully processed, at the time of determining whether there is an abnormal device with respect to the case that the content is stored in multiple devices, the processing method is the same as when the service processing information is the percentage of services successfully processed, and therefore repeated description of the processing method is not provided in this embodiment.

Optionally, if whether there is an abnormal device is determined according to the percentage of services unsuccessfully processed of the devices in this case, after each measurement period ends, the percentage of services unsuccessfully processed of the one or more devices storing the content is sorted, and whether there is an abnormal device is determined according to the result of the sorting of the percentage of services unsuccessfully processed of the one or more devices. For example, when the difference between the percentage of services unsuccessfully processed of two devices is higher than a preset threshold, it is determined that there is an abnormal device and the device having a higher percentage of services unsuccessfully processed is the abnormal device. For example, for the service request for the same content A, the percentage of services unsuccessfully processed of the CDF entity 1 is 0.5 while the percentage of services unsuccessfully processed of the CDF entity 2 is 0. Because the difference between the percentage of services unsuccessfully processed of the two CDF entities is "50%", if the preset threshold is 40%, it is determined that the CDF entity 1 which has a higher percentage of services unsuccessfully processed is an abnormal device, because the difference 50% between percentage of services unsuccessfully processed of the two CDF entities is larger than the preset threshold 40%. The preset threshold may be determined by configuration, and this embodiment does not limit the specific magnitude of the preset threshold. Similarly, if the service processing information is the number of services unsuccessfully processed, at the time of determining whether there is an abnormal device with respect to the case that the content is stored in multiple devices, the processing method is the same as when the service processing information is the percentage of services unsuccessfully processed, and therefore repeated description of the processing method is not provided in this embodiment.

II. The content is stored on one device:

In this case, at the time of determining whether there is an abnormal device, the absolute value of the percentage of services successfully processed of the device is used as a basis for determining whether the device is an abnormal device.

Specifically, whether the device is an abnormal device may be determined according to the relationship between the absolute value of the percentage of services successfully processed and a preset threshold. For example, assuming that the threshold is 0.5, if one piece of content is stored on only the CDF entity 1, and the percentage of services successfully processed of the CDF entity 1 with respect to the content is less than the threshold, it is determined that the device is an abnormal device. With the percentage of services successfully processed of the device being 0.4 as an example, because the absolute value of the percentage of services successfully processed of the device is 0.4, which is less than the threshold 0.5, it is determined that the device is an abnormal device. The specific value of the threshold may be determined by the configuration, and this embodiment does not limit the specific magnitude of the threshold.

Optionally, if whether there is an abnormal device is determined according to the percentage of services unsuccessfully processed of the device in this case, the absolute value of the percentage of services unsuccessfully processed of the device is used as a basis for determining whether there is an abnormal device. Specifically, whether the device is an abnormal device may be determined according to the relationship between the absolute value of the percentage of services unsuccessfully processed and a threshold. For example, assuming that the threshold is 0.5, if one piece of content is stored on only the CDF entity 1, and the percentage of services unsuccessfully processed of the CDF entity 1 with respect to the content is larger than the threshold, it is determined that the device is an abnormal device. With percentage of services unsuccessfully processed of the device being 0.6 as an example, because the absolute value of the percentage of services unsuccessfully processed of the device is 0.6, which is less than the threshold 0.5, it is determined that the device is an abnormal device. The specific value of the threshold may be determined by the configuration, and this embodiment does not limit the specific magnitude of the threshold.

It should be noted that the abnormal device mentioned in this embodiment and in follow-up embodiments refers to a device whose actual processing capability is lower than the expected processing capability of the device. The fact that the actual processing capability of the device is lower than the expected processing capability of the device is likely to be caused by various reasons, for example, a loophole inside the device, leakage of the memory in part or in whole, human misoperation, damage of interface performance, and damage of a stored file, which is not described in detail in this embodiment. When the processing capability of an abnormal device is zero, the abnormal device is considered to be in a failure state.

Preferably, after it is determined that there is an abnormal device, if it is determined that the content is stored on only one abnormal device, in order to guarantee the percentage of services successfully processed, this embodiment uses the method of copying the content stored on only the abnormal device to other normal same-level devices, and this embodiment does not limit the number of copies to other normal same-level devices, which may be determined according to the actual conditions, for example, the content on the abnormal device may be copied to two or three other normal same-level devices.

For the first selection method, when the delivery proportion is set for the one or more devices storing the content according to the number of abnormal devices, this embodiment does not limit the set delivery proportion, which may be set according to the actual conditions. In the case that the content is stored on only one abnormal device, after receiving the service request, the CCF entity may deliver the service request for the content to the normal same-level devices and the abnormal device for the purpose of reducing the number of service requests delivered to the abnormal device. This embodiment does not limit the delivery proportion, which may be determined by the specific configuration.

For example, assuming that only the CDF entity 1 stores the content A, for the service requests for the content A, when the CDF entity 1 is not determined to be an abnormal device, all the service requests are delivered to the CDF entity 1; when it is determined that the CDF entity 1 is an abnormal device, it is necessary to copy the content A to other normal same-level devices, and when the service requests for the content A are delivered during the next measurement period, not all service requests are delivered to the CDF entity 1, and instead, some service requests need to be delivered to the other normal same-level devices which the content A is copied. It can be seen that, the number of service requests delivered to the abnormal device, that is, the number of service requests delivered to the CDF entity 1 is reduced.

If the content is stored not only on the abnormal device, but also on the other normal devices, it is necessary to reduce the proportion of the number of service requests delivered to the abnormal device. For example, when it is determined that the CDF entity 1 is not an abnormal device, if the number of service requests delivered to the CDF entity 1 is 50% of a total number of service requests are delivered by the content source, after it is determined that the CDF entity 1 is an abnormal device and the proportion of the number of service requests delivered to the CDF entity 1 is reduced, the number of service requests delivered to the CDF entity 1 is reduced to 20% of a total number of service requests. This embodiment does not limit the proportion of reduction, which may be set according to the actual conditions.

Further, if the percentage of services successfully processed or the number of services successfully processed of the abnormal device is zero during multiple consecutive measurement periods, or if the percentage of services unsuccessfully processed of the abnormal device is 1 during multiple consecutive measurement periods, or if the number of services unsuccessfully processed of the abnormal device is equal to a total number of service requests delivered to the abnormal device during multiple consecutive measurement periods, the abnormal device is set to a failure state, and the delivery of a service request to the abnormal device is stopped. This embodiment does not limit the number of multiple consecutive measurement periods, which may be set according to the configuration, for example, three consecutive measurement periods.

For the second selection method, when one of the first N devices is selected to respond to the service request, it is necessary to sort the current service processing information of the one or more devices. The sorting may be performed in many ways. Because this embodiment selects one of the first N devices to respond to the service request, the percentage of services successfully processed or numbers of services successfully processed of the first N devices should be high, or the percentage of services unsuccessfully processed or numbers of services unsuccessfully processed of the first N devices should be low. Therefore, in specific sorting, if the service processing information is the percentage of services successfully processed or the number of services successfully processed, the devices are arranged in descending order according to the percentage of services successfully processed or numbers of services successfully processed, and if the service processing information is the percentage of services unsuccessfully processed or the number of services unsuccessfully processed, the devices are arranged in ascending order according to the percentage of services unsuccessfully processed or numbers of services unsuccessfully processed, therefore ensuring that the first N devices have higher service processing capability. This embodiment does not limit the specific numerical value of N.

It should be noted that, in the second selection method, because the devices need to be sorted according to the current service processing information of the one or more devices, and the service processing information of the one or more devices is likely to be updated after each measurement period ends, the one or more devices storing the content needs to be sorted again according to the updated service processing information of the one or more devices after each measurement period ends, and according to the result of the new sorting of the one or more devices storing the content, one device is selected to respond to the service request.

302. The CCF entity sends the received service request to the selected CDF entity.

Because the CCF entity selects one CDF entity according to the service processing information of the CDF entities to deliver the service request, it can be known from step 301 that, the percentage of services successfully processed or the number of services successfully processed of the selected CDF entity is higher, or the percentage of services unsuccessfully processed or the number of services unsuccessfully processed is lower, that is, the service processing capability of the selected CDF entity is higher, so that the percentage of services successfully processed can be guaranteed by sending the received service request to the selected CDF entity.

303. The selected CDF entity processes the service request and after the processing is completed, returns a service response to the CCF entity.

This step is a preferred step, and the service response carries a service processing success identifier or a service processing failure identifier; because the selected CDF entity returns the service response to the CCF entity after completing the processing of the service request, the CCF entity may know whether the service processing of the selected CDF entity is successful or not according to the service processing success identifier or the service processing failure identifier in the received service response. Therefore, the CCF entity obtains the service processing information of the selected CDF entity 304. Receive the service response returned by the selected CDF entity, and update, according to the service response returned by the selected CDF entity, the service processing information of the selected CDF entity.

Specifically, when updating the service processing information of the selected device according to the service response returned by the selected device, this embodiment includes the following steps:

firstly, in one measurement period, receiving the service response returned by the selected device, where the service response carries a service processing success identifier or a service processing failure identifier;

secondly, recording the number of service requests received by the selected device, and the number of services successfully processed or the number of services unsuccessfully processed; and finally, after one measurement period ends, updating the service processing information of the selected device according to the number of service requests received by the selected device and, the number of services successfully processed or the number of services unsuccessfully processed. For example, the service processing information of this embodiment is the percentage of services successfully processed. Therefore, after one measurement period ends, the percentage of services successfully processed of the selected device is calculated according to the number of service requests received by the selected device and the number of services successfully processed, and then the calculated percentage of services successfully processed is used as the service processing information in the next measurement period, therefore updating the service processing information of the selected device.

On the basis of this step, when the CCF entity in step 301 selects, according to the service processing information of the CDF entity 1 and the CDF entity 2 storing the content, one CDF entity to respond to the service request, the selection needs to be performed according to the updated service processing information of the CDF entities.

In summary, the method of this embodiment delivers a service request according to the number of services successfully processed, or a percentage of services successfully processed, or the number of services unsuccessfully processed or a percentage of services unsuccessfully processed, therefore improving the percentage of services successfully processed, preventing waste of resources, and reducing unnecessary service loss; and in addition, when the content is stored on only one abnormal device, the method of this embodiment also supports copying of the content to other normal same-level devices, therefore ensuring the percentage of services successfully processed.

Embodiment 3

Figure 4:
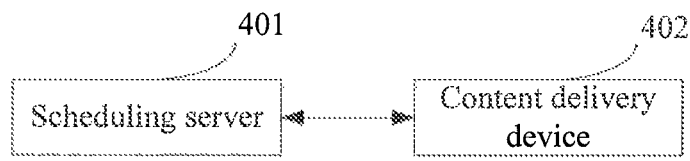
FIG. 4 is a schematic structural diagram of a system for content delivery according to a third embodiment of the present disclosure.

Referring to FIG. 4, this embodiment provides a system for content delivery, including: a scheduling server 401 and a content delivery device 402.

The scheduling server 401 is configured to receive a service request for accessing content; select, according to the service processing information of one or more content delivery devices 402 storing the content, one content delivery device 402 to respond to the service request, where the service processing information includes at least one of the number of services successfully processed, a percentage of services successfully processed, the number of services unsuccessfully processed, and a percentage of services unsuccessfully processed; and send the received service request to the selected content delivery device 402.

The content delivery device 402 is configured to receive the service request sent by the scheduling server 401.

Further, the content delivery device 402 is also configured to return a service response to the scheduling server 402 after processing the received service request.

The scheduling server 401 is also configured to receive the service response returned by the content delivery device 402, and according to the service response returned by the selected content delivery device 402, update the service processing information of the selected content delivery device 402.

Accordingly, when the scheduling server 401 selects, according to the service processing information of the one or more content delivery devices 402 storing the content, one content delivery device 402 to respond to the service request, the scheduling server 401 is specifically configured to select, according to the updated service processing information of the one or more content delivery devices 402 storing the content, one content delivery device 402 to respond to the service request.

In the system for content delivery according to this embodiment, the scheduling server delivers a service request according to the number of services successfully processed, or a percentage of services successfully processed, or the number of services unsuccessfully processed, or a percentage of services unsuccessfully processed of the content delivery device, therefore improving the percentage of services successfully processed, preventing waste of resources, and reducing unnecessary service loss.

Embodiment 4

Figure 5:
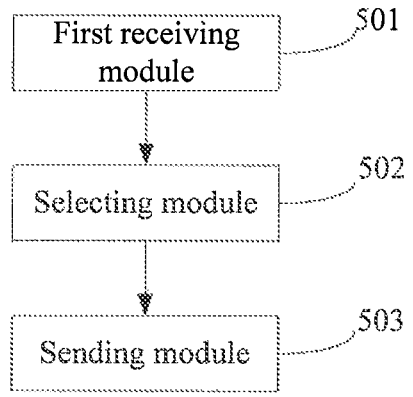
FIG. 5 is a schematic structural diagram of a scheduling server according to a fourth embodiment of the present disclosure.

Referring to FIG. 5, this embodiment provides a scheduling server, including:

a first receiving module 501, configured to receive a service request for accessing content;

a selecting module 502, configured to select, according to the service processing information of one or more devices storing the content, one device to respond to the service request;

where, the service processing information includes at least one of the number of services successfully processed, a percentage of services successfully processed, the number of services unsuccessfully processed, and a percentage of services unsuccessfully processed; and a sending module 503, configured to send the service request received by the first receiving module 501 to the device selected by the selecting module 502.

Figure 6:
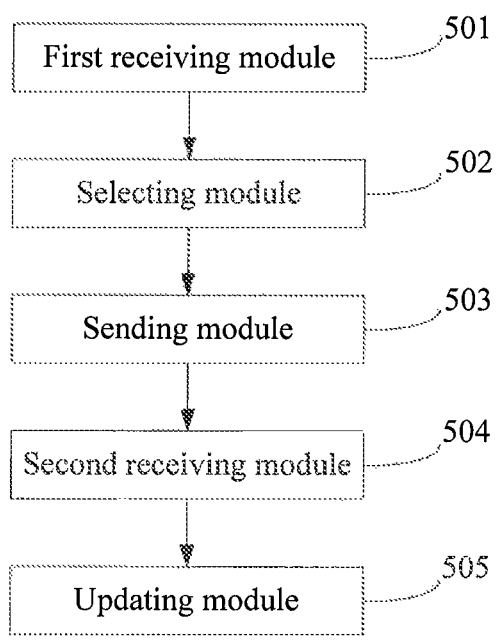
FIG. 6 is a schematic structural diagram of another scheduling server according to the fourth embodiment of the present disclosure.

Further, referring to FIG. 6, the scheduling server also includes:

a second receiving module 504, configured to receive a service response returned by the device selected by the selecting module 502; and an updating module 505, configured to update the service processing information of the selected device according to the service response returned by the selected device.

Accordingly, the selecting module 502 is specifically configured to select, according to the updated service processing information of the one or more devices storing the content, one device to respond to the service request.

Figure 7:
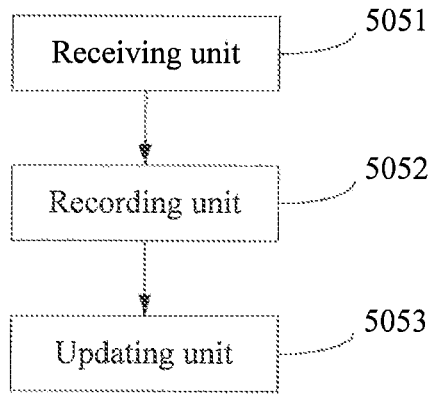
FIG. 7 is a schematic structural diagram of an updating module according to the fourth embodiment of the present disclosure.

Specifically, referring to FIG. 7, the updating module 505 includes:

a receiving unit 5051, configured to receive, in one measurement period, the service response returned by the selected device, where the service response carries a service processing success identifier or a service processing failure identifier;

a recording unit 5052, configured to record the number of service requests received by the selected device, and the number of services successfully processed or the number of services unsuccessfully processed; and an updating unit 5053, configured to update, after one measurement period ends, the service processing information of the selected device according to the number of service requests received by the selected device and the number of services successfully processed or the number of services unsuccessfully processed.

Figure 8:
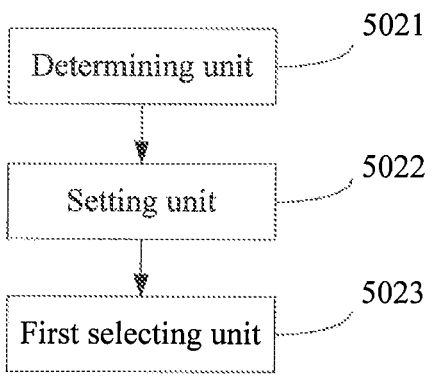
FIG. 8 is a schematic structural diagram of a first selecting module according to the fourth embodiment of the present disclosure.

Referring to FIG. 8, the selecting module 502 includes:

a determining unit 5021, configured to determine, after one measurement period ends, whether there is an abnormal device according to the relationship between the service processing information of the one or more devices storing the content and a preset threshold;

a setting unit 5022, configured to set, according to the number of abnormal devices, a delivery proportion for the one or more devices storing the content; and a first selecting unit 5023, configured to select, according to the set delivery proportion of the devices storing the content, one device to respond to the service request.

The determining unit 5021 is configured to determine, when the difference of the value of service processing information of the one or more devices storing the content is higher than the preset threshold, that the device with the value of lower service processing information is an abnormal device; or to determine that the device whose number of services successfully processed or the percentage of services successfully processed is lower than the preset threshold is an abnormal device; or to determine that the device whose number of services unsuccessfully processed or the percentage of services unsuccessfully processed is higher than the preset threshold is an abnormal device. This embodiment does not limit the magnitude of the preset threshold.

Figure 9:
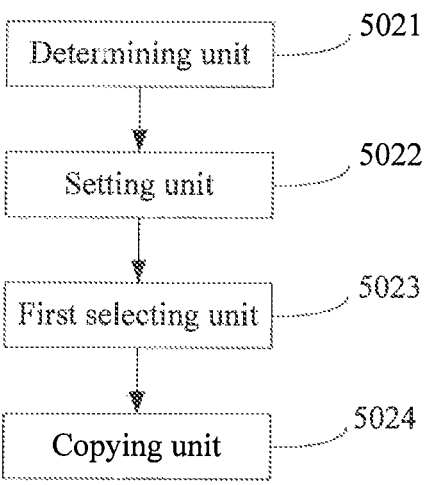
FIG. 9 is a schematic structural diagram of a second selecting module according to the fourth embodiment of the present disclosure.

Referring to FIG. 9, the selecting module 502 also includes:

a copying unit 5024, configured to copy the content to other normal same-level devices when it is determined that there is an abnormal device and the content is stored on only this abnormal device.

The setting unit 5022 is configured to set the abnormal device to a failure state and stop delivering a service request to the abnormal device, when the percentage of services successfully processed or the number of services successfully processed of the abnormal device is zero during multiple consecutive measurement periods, or when the percentage of services unsuccessfully processed of the abnormal device is 1 during multiple consecutive measurement periods, or when the number of services unsuccessfully processed of the abnormal device is equal to a total number of service requests delivered to the abnormal device during multiple consecutive measurement periods.

Figure 10:
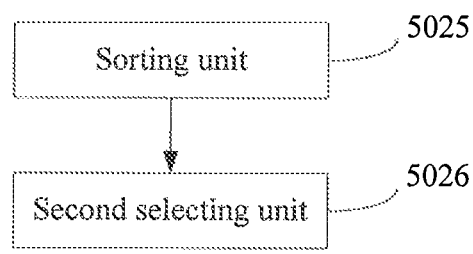
FIG. 10 is a schematic structural diagram of a third selecting module according to the fourth embodiment of the present disclosure.

Optionally, referring to FIG. 10, the selecting module 502 includes:

a sorting unit 5025, configured to sort the service processing information of the one or more devices storing the content; and a second selecting unit 5026, configured to select, according to the sequence corresponding to the current service processing information of the one or more devices storing the content, one of the first N devices to respond to the service request, where N is a natural number less than a total number of all devices storing the content.

The scheduling server of this embodiment delivers a service request according to the number of services successfully processed, or a percentage of services successfully processed, or the number of services unsuccessfully processed, or a percentage of services unsuccessfully processed, therefore improving the percentage of services successfully processed, preventing waste of resources, and reducing unnecessary service loss; and in addition, when the content is stored on only one abnormal device, the scheduling server of this embodiment also supports copying of the content to other normal same-level devices, therefore ensuring the percentage of services successfully processed.

It should be noted that in the foregoing implementation of the scheduling server, the division of functional modules is used as an example for description only. In practical applications, the functions may be completed by different functional modules as necessary, such as according to configuration requirements of corresponding hardware or for the convenience of implementation of software, that is, the internal structure of the scheduling server is divided into different functional modules to complete all or part of functions as described above. And in practical applications, the corresponding functional modules in this embodiment may be implemented by corresponding software, or by corresponding software executed by corresponding hardware, for example, the foregoing sending module 503 may be hardware capable of executing the foregoing functions, such as a sending device having such capability of sending, or other general-purpose sending apparatuses capable of executing foregoing functions, or a general sending device capable of executing a corresponding computer program to complete the foregoing functions, or other hardware devices.

The sequence numbers of the above embodiments of the present disclosure are used for description only and do not represent merits or demerits of the embodiments.

All or part of steps of the embodiments of the present disclosure may be implemented by software, and the corresponding software programs may be stored in a readable storage medium, such as a compact disk-read only memory (CD-ROM) or a hard disk.

The above descriptions are merely preferred embodiments of the present disclosure, but not intended to limit the present disclosure. Any modification, equivalent substitution, improvement, and so on within the spirit and principle of the present disclosure shall be included in the scope of the present disclosure.

What is claimed is:

1. In a scheduling server, a method for content delivery, comprising:

receiving a service request for accessing a content;

selecting according to service processing information of one or more devices storing the content, one device among the one or more devices storing the content for responding to the service request; and sending the received service request to the selected device, wherein a delivery proportion is assigned to each of the one or more devices storing the content and service requests are forwarded to each device according to its delivery proportion, wherein selecting one device among the one or more devices storing the content for responding to the service request comprises:

identifying, after a measurement period ends, abnormal device(s) among the one or more devices storing the content according to a relationship between the service processing information of the one or more devices storing the content and a preset threshold;

updating the delivery proportions of the one or more devices that store the content by reducing delivery proportion(s) of the abnormal device(s); and based upon the updated delivery proportions, selecting on device among the one or more devices storing the content for responding to the service request;

wherein the service processing information of a device includes at least one of the following:

number of services successfully processed by the device, percentage of services successfully processed by the device, number of services unsuccessfully processed by the device, and percentage of services unsuccessfully processed by the device.

2. The method according to claim 1, further comprising:
receiving a service response from the selected device in response to the service request, and updating the service processing information of the selected device according to the service response.

3. The method according to claim 2, wherein receiving the service response from the selected device and updating the service processing information of the selected device according to the service response comprises:

receiving, in a measurement period, the service response from the selected device, wherein the service response carries a service processing success identifier or a service processing failure identifier;

updating the number of service requests received by the selected device, and the number of services successfully processed or the number of services unsuccessfully processed by the selected device; and after the measurement period ends, updating the service processing information of the selected device according to the number of service requests received by the selected device and the number of services successfully processed or the number of services unsuccessfully processed by the selected device.

4. The method according to claim 1, wherein an abnormal device is identified if:

the number of services successfully processed by the device is lower than that of any other devices that store the content by a preset threshold, or the percentage of services successfully processed by the device is lower than that of any other devices that store the content by a preset threshold, or the number of services unsuccessfully processed by the device is higher than that of any other devices that store the content by a preset threshold, or the percentage of services unsuccessfully processed by the device is higher than that of any other devices that store the content by a preset threshold, or the number of services successfully processed by the device is lower than a preset threshold, or the percentage of services successfully processed by the device is lower than a preset threshold, or the number of services unsuccessfully processed by the device is higher than a preset threshold, or the percentage of services unsuccessfully processed by the device is higher than a preset threshold.

5. The method according to claim 1, further comprises:
identifying an abnormal device as a failure device and delivering no further service requests to the abnormal device if the percentage of services successfully processed or the number of services successfully processed by the abnormal device is zero during multiple consecutive measurement periods, or if the percentage of services unsuccessfully processed of the abnormal device is 100% during the multiple consecutive measurement periods, or if the number of services unsuccessfully processed by the abnormal device is equal to a total number of service requests delivered to the abnormal device during the multiple consecutive measurement periods.

6. A scheduling server, comprising a transceiver and a processor, wherein:

the transceiver is configured to receive a service request for accessing a content;

the processor is configured to select according to service processing information of one or more devices storing the content, one device among the one or more devices storing the content for responding to the service request; and the transceiver is further configured to send the received service request to the selected;

wherein a delivery proportion is assigned to each of the one or more devices storing the content and service requests are forwarded to each device according to its delivery proportion, wherein the processor configured to select one device among the one or more devices storing the content for responding to the service request is configured to:

identify, after a measurement period ends, abnormal device(s) among the one or more devices storing the content according to a relationship between the service processing information of the one or more devices storing the content and a preset threshold; update the delivery proportions of the one or more devices that store the content by reducing delivery proportion(s) of the abnormal device(s); and, based upon the updated delivery proportions, select one device among the one or more devices storing the content for responding to the service request;

and wherein the service processing information of a device includes at least one of the following:

number of services successfully processed by the device, percentage of services successfully processed by the device, number of services unsuccessfully processed by the device, and percentage of services unsuccessfully processed by the device.

7. The scheduling server according to claim 6, wherein:
the transceiver is further configured to receive a service response from the selected device in response to the service request; and the processor is further configured to update, according to the service response, the service processing information of the selected device.

8. The scheduling server according to claim 7, wherein:
the transceiver is configured to receive a service response from the selected device in response to the service request is configured to receive, in a measurement period, the service response from the selected device, wherein the service response carries a service processing success identifier or a service processing failure identifier;

and the processor is configured to update the service processing information of the selected device is configured to record the number of service requests received by the selected device, and the number of services successfully processed or the number of services unsuccessfully processed by the selected device, and update, after the measurement period ends, the service processing information of the selected device according to the number of the service requests received by the selected device and the number of services successfully processed or the number of services unsuccessfully processed by the selected device.

9. The scheduling server according to claim 6, wherein the processor is further configured to identify an abnormal device as a failure device and stop delivering deliver no further service requests to the abnormal device if the percentage of services successfully processed or the number of services successfully processed by the abnormal device is zero during multiple consecutive measurement periods, or if the percentage of services unsuccessfully processed of the abnormal device is 100% during multiple consecutive measurement periods, or if the number of services unsuccessfully processed by the abnormal device is equal to a total number of service requests delivered to the abnormal device during the multiple consecutive measurement periods.

10. A computer program product comprising a non-transitory computer readable storage medium storing a set of instructions, wherein the set of instructions direct a scheduling server to perform acts of:
   receiving a service request for accessing a content;
   obtaining service processing information of one or more devices storing the content;
   selecting, according to the service processing information of the one or more devices storing the content, one device among the one or more devices storing the content for responding to the service request, and
   sending the received service request to the selected device;
   wherein a delivery proportion is assigned to each of the one or more devices storing the content and service requests are forwarded to each device according to its delivery proportion, wherein selecting one device among the one or more devices storing the content for responding to the service request comprises:
      identifying, after a measurement period ends, abnormal device(s) among the one or more devices storing the content according to a relationship between the service processing information of the one or more devices storing the content and a preset threshold;
      updating the delivery proportions of the one or more devices that store the content by reducing delivery proportion(s) of the abnormal device(s); and
      based upon the updated delivery proportions, selecting one device among the one or more devices storing the content for responding to the service request;
   wherein the service processing information of a device includes at least one of the following:
      number of services successfully processed by the device,
      percentage of services successfully processed by the device,
      number of services unsuccessfully processed by the device, and
      percentage of services unsuccessfully processed by the device.

11. The computer program product according to claim 10, wherein the set of instructions further direct the scheduling server to perform acts of:
   receiving a service response from the selected device in response to the service request, and updating the service processing information of the selected device according to the service response.

12. The computer program product according to claim 11, wherein receiving the service response from the selected device and updating the service processing information of the selected device according to the service response comprises:
   receiving, in a measurement period, the service response from the selected device, wherein the service response carries a service processing success identifier or a service processing failure identifier;
   updating the number of service requests received by the selected device, and the number of services successfully processed or the number of services unsuccessfully processed by the selected device; and
   after the measurement period ends, updating the service processing information of the selected device according to the number of service requests received by the selected device and the number of services successfully processed or the number of services unsuccessfully processed by the selected device.

13. The computer program product according to claim 10, wherein an abnormal device is identified if:
   the number of services successfully processed by the device is lower than that of any other devices that store the content by a preset threshold, or
   the percentage of services successfully processed by the device is lower than that of any other devices that store the content by a preset threshold, or
   the number of services unsuccessfully processed by the device is higher than that of any other devices that store the content by a preset threshold, or
   the percentage of services unsuccessfully processed by the device is higher than that of any other devices that store the content by a preset threshold, or
   the number of services successfully processed by the device is lower than a preset threshold, or
   the percentage of services successfully processed by the device is lower than a preset threshold, or
   the number of services unsuccessfully processed by the device is higher than a preset threshold, or
   the percentage of services unsuccessfully processed by the device is higher than a preset threshold.

14. The computer program product according to claim 10, wherein the set of instructions direct the scheduling server to further perform acts of:
   identifying an abnormal device as a failure device and delivering no further service requests to the abnormal device if the percentage of services successfully processed or the number of services successfully processed by the abnormal device is zero during multiple consecutive measurement periods, or if the percentage of services unsuccessfully processed of the abnormal device is 100% during the multiple consecutive measurement periods, or if the number of services unsuccessfully processed by the abnormal device is equal to a total number of service requests delivered to the abnormal device during the multiple consecutive measurement periods.

* * * * *